Figure 1:
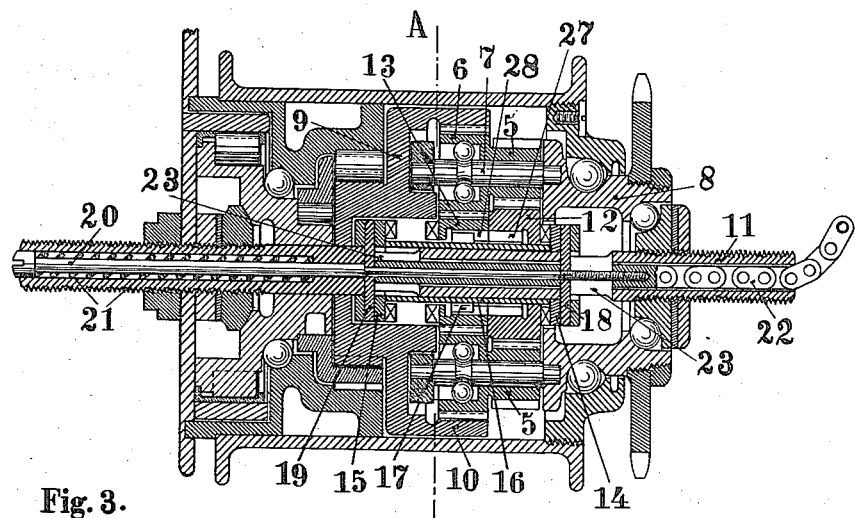

F. WINKLER.
VARIABLE SPEED GEARING.
APPLICATION FILED FEB. 3, 1912.

1,045,236.

Patented Nov. 26, 1912.

2 SHEETS—SHEET 1.

Witnesses

Inventor

UNITED STATES PATENT OFFICE.

FRANZ WINKLER, OF SCHWEINFURT, GERMANY, ASSIGNOR TO SCHWEINFURTER PRÄCISIONS-KUGEL-LAGER-WERKE FICHTEL & SACHS, OF SCHWEINFURT, GERMANY, A FIRM.

VARIABLE-SPEED GEARING.

1,045,236.  Specification of Letters Patent.  Patented Nov. 26, 1912.

Application filed February 3, 1912. Serial No. 675,338.

*To all whom it may concern:*

Be it known that I, FRANZ WINKLER, a subject of the King of Bavaria, residing at No. 23 Rossbrunnstrasse, Schweinfurt, in Germany, have invented a new and useful Variable-Speed Gearing, of which the following is a specification.

This invention relates to a variable speed gearing which is adapted and utilizable for various applications and may especially be advantageously used in bicycles in connection with a coaster-brake.

The object of the invention is to provide a variable speed gearing with a range of three speeds which are obtained by two sets of planet gearing embodied in the mechanism in such a manner that the different speeds can be produced without displacing any element of the gearing itself.

A further object of the invention resides in a special clutch member common to both sets of planet gearings by which the driven member can be made solid or direct in the normal operation, all gears being thereby disconnected from fixed parts, while with the drive at the other speeds the train idle at the time being has its sun-wheel free to rotate, thereby reducing friction.

These objects are attained by the employment of two sets of planet gears, one of which is in connection with an internally toothed rim, while both are rotatably supported by a power transmitting or receiving element of the mechanism, the toothed rim being provided on the counter-element.

A further essential feature is the fact that the stepped planet-gears are in engagement with sun wheels guided between the driving and driven members in a non-displaceable manner but free to rotate. Means are also provided, whereby the sun wheels can be connected in locked engagement with one another or with fixed members of the construction, thereby enabling the entire differential gearing to operate in the same manner in either direction of rotation, this means being of a shifting character and controlled by suitable actuating devices arranged at any distance, being so devised as to be entirely or partly freely rotatable, so that when rigidly locked, the gear is rotatable without other friction than that existing between the connecting means and the fixed shaft; on the other hand the sun wheel of the idle set is entirely disconnected from the fast parts, friction being minimized owing to the free movement of the respective gear wheels.

In the accompanying drawings, which form a part of this specification, two constructional forms of a differential gearing with two sets of epicyclic gears embodying the invention are represented in order to clearly illustrate the subject matter of the invention.

Figure 3:
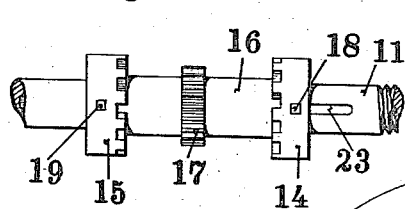
Figure 2:
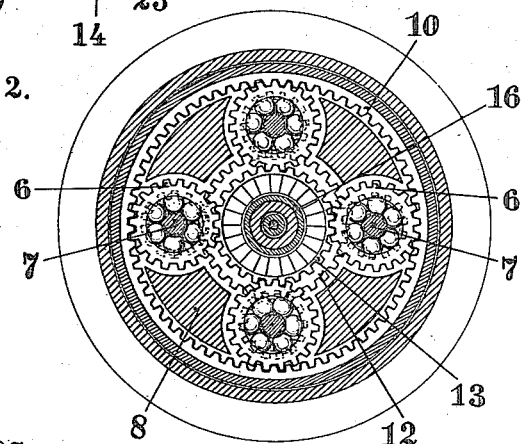
Figure 4:
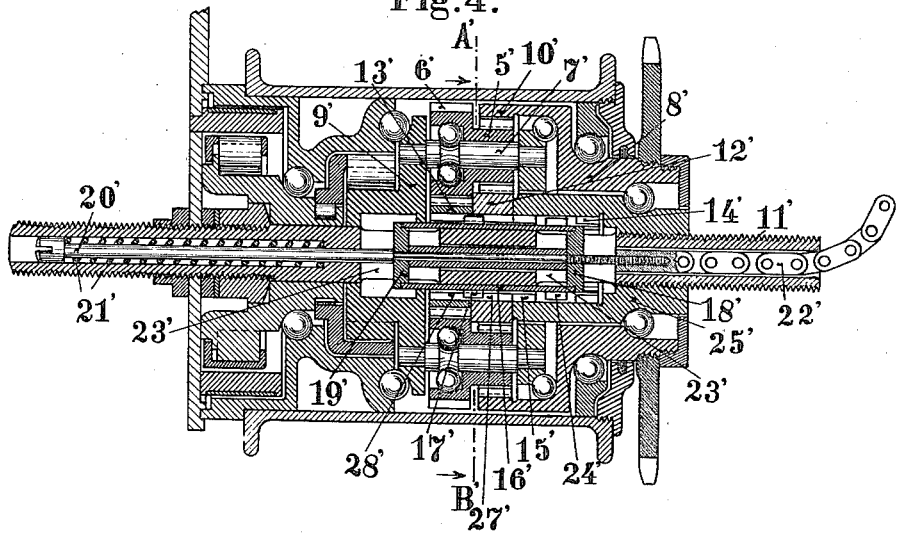
Figure 5:
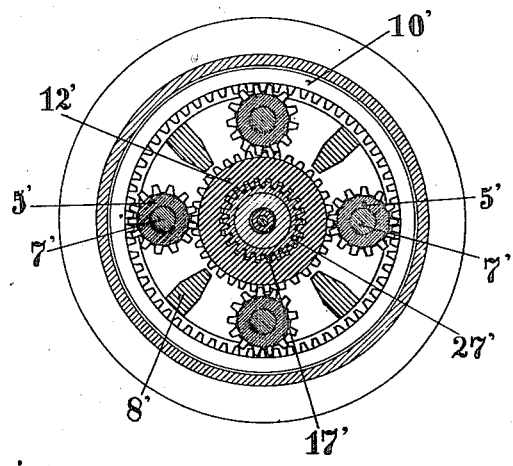

Figure 1 represents a longitudinal section of a differential gearing in accordance with the invention as combined with a free wheel coaster-brake located in a cycle-hub. Fig. 2 shows a cross-section of the gearing, taken on the line A—B of Fig. 1. Fig. 3 is a plan of the connecting means, wherein part of the axle-shaft is shown upon which it is displaceable. Fig. 4 is a longitudinal sectional elevation of the second constructional form, similar to that in Fig. 1, and Fig. 5 is a cross section taken on the line A'—B' of Fig. 4.

Like numerals denote like parts throughout all figures of the drawing.

Referring to the construction shown in Figs. 1 to 3, the differential gearing comprises a suitable number of stepped pinions 5 and 6 integral or rigidly connected with one another, whose pivots 7 are secured in the driving member 8, an internal toothed rim 10 provided on the driven member 9 with which the larger planet pinions 6 mesh, and two sun gear wheels 12 and 13 of different diameter mounted on the shaft 11 of the entire gearing and meshing with the planet pinions 5 and 6. The change-over device for obtaining various speeds comprises two clutch disks 14 and 15 toothed at their opposite sides and arranged axially displaceable but non-revoluble and able to engage with the correspondingly toothed adjacent ends of the respective sun gear wheels 12 and 13, and a sleeve 16 having a toothed rim 17, which sleeve is guided between the disks 14 and 15 and free to rotate on the shaft, clutch teeth 27 and 28, corresponding to the toothed rim 17 of the sleeve, being provided in the bores of the sun wheels 12 and 13 respectively which wheels are located on the said sleeve.

The shaft 11 is hollow and has transverse slots 23 at two places through which cotters 18 and 19 pass which also extend through the clutch disks 14 and 15 and hold them non-revoluble, simultaneously positively connecting them with a rod 20 which is axially displaceable in the bore of the shaft 11 and is under the action of a spring 21 tending to pull it to the left in Fig. 1. The other end of the rod is connected with a chain 22 by which the rod can be pulled to the right, whereby the spring 21 is compressed. The device for shifting the rod 20 may be modified, as its construction is of secondary importance. Any suitable means may be attached to the chain 22 for transmitting thereon a pull exerted at a given distance from the device. Such means are well known and, therefore, not represented. In the example illustrated the planet gearing is represented connected with the hub of a vehicle, but the differential gearing which is the subject matter may be used for any desired purpose, for example with countershafts or a lathe.

The described gearing operates as follows: When the chain 22 is pulled and the change-over device so adjusted that half of the toothed rim 17 meshes with the internal teeth of each of the two sun gears 12 and 13 (as shown in Fig. 4), the latter are non-revolubly coupled with one another. As the two steps 5 and 6 of the planet pinions which are integral with one another cannot rotate relatively to one another, the two sets of planet gears of the differential gearing are now rigidly connected together and with the driving and driven members and the force of the driving member 8 is transmitted without change of angular velocity to the driven member 9. When the clutch device is then shifted still farther to the right, until the sun gear wheel 13 is coupled with the non-revoluble clutch disk 15, when the driving member 8 is rotated the pinions 6 rotate about their pivots 7 and roll on the sun gear wheel 13 and also on the internally toothed rim 10 of the driven member 9 which consequently revolves faster than the driving member. Since the clutch sleeve 16 is rotatable on the shaft, the sun wheel 12 coupled therewith by the rim 17, in this case allows the other set of planet gear freely to rotate. This position of the differential gearing gives the middle speed of transmission. If the chain 22 is now released so that the spring 21 can return the change-over device to the position shown in Fig. 1 in which the sun gear wheel 12 is coupled with the clutch disk 14 and fixed non-revoluble, the smaller step 5 of the planet pinions will roll on the larger sun gear wheel 12, while the larger step 6 of the planet pinions in this case rotates the driven member owing to their engagement with the toothed rim 10, as described heretofore. The sun gear wheel 13 is coupled only with the sleeve 16 by the clutch 17 and can therefore freely rotate together with it. This connection gives the greatest speed of transmission.

In the construction according to Figs. 4 and 5 the arrangement is similar but reversed as compared with that in Figs. 1 to 3, the smaller step 5' of the planet pinions meshing with the internal toothed rim 10' which is provided on the driving member 8', while the pivots 7' are mounted on the driven member 9'. In the change-over device the clutch disks above-named are omitted, and the sleeve 16', positively guided between the cotters 18' and 19', is besides the rim 17' provided with a second toothed rim 24' which can engage, in the end positions of the sleeve, with corresponding counter clutch members in the form of internal toothed rims 14' and 15' provided on a member 25' fast on the shaft 11'. Consequently, the sleeve 16' is either free to rotate in the middle position in which it is shown in Fig. 4 and directly couples the two sun gear wheels 12' and 13' with one another by means of the toothing 17' engaging in the internal teeth 27' and 28' of both sun gear wheels, or in its end positions non-revolubly secures either the sun gear wheel 12' by means of the clutches 17', 27', 24' and 14' or the sun gear wheel 13' by means of the clutches 17', 28', 24' and 15'. The differential gearing of this construction operates as follows: When the two sun gear wheels 12' and 13' are coupled together by the toothed rim 17' (Fig. 4), no change of speed takes place because no relative rotation can occur in the gear, but the driving member 8' drives the driven member 9' at the same speed, the sleeve 16' likewise rotating. The greatest speed is then obtained. If the chain 22' and the rod 21' are pulled and the sleeve 16' shifted into its right-hand end position, the toothed rim 24' meshes with the toothed rim 14', so that the sleeve 16' is non-revolubly fixed and also the sun gear wheel 12' by the latter through the medium of the clutch teeth 17' and 27'. When the driving member 8' is rotated the smaller steps 5' of the planet pinions will now roll in the backward direction on the internal toothed rim 10' provided on it, rotating about their pivots 7' and simultaneously rolling on the fixed sun gear wheel 12'. Consequently, the driven member 9' forming the planet-wheel carrier will rotate at a lower speed than the driving member 8'. The lowest speed is obtained with this connection. If the sun gear wheel 13' is held non-revoluble by means of the correspondingly displaced change-over device by the clutches 15' and 24', and 17' and 28' being engaged respectively, as before the pinions 5' roll on the internal toothed rim 10' while the larger planet pinions 6' roll on the sun gear wheel 13'. The sun gear wheel 12' is free to rotate. In this connection the middle speed of transmission is obtained.

The described arrangement of the differential gearing has the advantage that all the gears permanently remain at their predetermined places and only a reversing mechanism requires to be axially shifted in order to couple the sun gear wheels corresponding to the various requirements of the gearing. At the normal speed the gears are completely free from fixed parts, while all the parts are rigidly and positively connected together, so that friction in the gearing is avoided as much as possible. Owing to the two sets being firmly connected together by the two steps of the planet pinions it is possible, solely by means of coupling the sun gear wheels in various ways, to obtain the three different speeds of transmission with the aid of one single common device and by using a few clutches.

Obviously, and as illustrated by two constructional forms, the differential gearing may be varied in various ways without departing from the principle of my invention.

What I, therefore, broadly claim as my invention, and desire to secure by Letters Patent, is:—

1. In a variable speed gearing having two sets of planet gearing, the combination with a driving member, of a driven member, one of which carries the planet-gear and the other provided with an internally toothed rim, stepped planet gear wheels one step of which meshes with the said toothed rim, separate sun gear wheels engaging with the planet gears, the said sun wheels being rotatable but not displaceable and a clutch mechanism adapted to couple the sun gear wheels with one another or separately with fixed parts of the gear mechanism.

2. In a variable speed gearing having two sets of planet gearing, the combination with a driving member, of a driven member, an internally toothed rim provided on one of the members, stepped planet gear wheels in engagement with, and connecting the two members, separate sun gear wheels rotatably arranged but not displaceable, and an axially movable clutch device adapted either to couple the sun gear wheels with one another or to alternately fix one of them against rotation.

3. In a variable speed gearing having two sets of planet gearing, the combination with a driving member, of a driven member, stepped planet gear wheels in positive engagement with, and connecting the two members, separate sun gear wheels rotatably arranged but not displaceable, an axially movable clutch device adapted to couple the sun gear wheels with one another or to alternately fix one of them against rotation, and means for shifting the said clutch device.

4. In a variable speed gearing having two sets of planet gearing, the combination with a driving member, of a driven member, an internally toothed rim provided upon one of the said members, pivots on the other of the said members, stepped planet gear wheels in positive engagement with the driving and driven members by the said toothed rim and pivots, separate sun gear wheels rotatably arranged but not displaceable, and an axially movable connecting device adapted either to couple the sun gear wheels with one another or to alternately fix one of them against rotation.

5. In a variable speed gearing having a number of sets of planet gearing, the combination with a driving member, of a driven member, stepped planet gear wheels in positive engagement with, and connecting the said two members, separate sun wheels rotatably arranged but not displaceable, a sleeve axially movable within the sun wheels, and clutch devices provided on the sun wheels and combined with the said sleeve, said clutches being adapted either to couple the sun wheels with one another or to alternately fix one of them against rotation.

6. In a variable speed gearing having two sets of planet gearing, the combination with a driving member, of a driven member, stepped planet gear wheels in positive engagement with, and connecting the two members, separate sun gear wheels rotatably guided but not displaceable between the said members, an axially movable connecting mechanism, clutch devices arranged upon the sun wheels, and separate clutch devices provided upon the connecting mechanism which are adapted to couple the sun wheels with one another or to alternately fix one of them against rotation.

7. In a variable speed gearing having two sets of planet gearing, the combination with driving and driven members, of stepped planet gear wheels in positive engagement with said members, separate sun gear wheels rotatably guided but not displaceable, clutch teeth arranged in the bores of the sun wheels, and a connecting device axially movable within the sun wheels, said connecting device being provided with a toothed rim adapted to engage the clutch teeth of either or both sun wheels, and with a separate clutch capable of alternately fixing one of the sun wheels against rotation.

8. In a variable speed gearing having a plurality of sets of planet gearing, the combination with a driving member, of a driven member, stepped planet gear wheels in positive engagement with the said members, separate sun gear wheels rotatably arranged but not displaceable, an axially movable clutch device adapted to couple the sun gear wheels with one another or to alternately fix one of them against rotation, a holloshaft bearing the entire gearing and having a number of longitudinal slots, a rod axially displaceable within the shaft, and means connected to the rod and projecting through the said slots, so as to engage with the clutch device.

9. In a variable speed gearing having a number of sets of planet gearing, the combination with a driving member, of a driven member, stepped planet gear wheels in positive engagement with the said members, separate sun wheels rotatably arranged but not displaceable, an axially movable connecting device having separate clutches adapted to couple the sun gear wheels with one another or to alternately fix one of them against rotation, and a fixed member of the gearing with which the clutches are engaged for securing the sun wheels against rotation.

10. In a variable speed gearing, the combination with a driving member, of a driven member, stepped planet gear wheels in engagement with, and connecting the two members, separate sun gear wheels meshing with said planet gears, and a clutch mechanism adapted to couple the sun gear wheels with one another or separately with fixed parts of the gear mechanism.

11. In a variable speed gearing having two sets of planet gearing, the combination with a driving member, of a driven member, stepped planet gear wheels in engagement with, and connecting the two members, separate sun gear wheels rotatably arranged but not displaceable, and an axially movable clutch device adapted either to couple the sun gear wheels with one another or to alternately fix one of them against rotation.

In testimony whereof I have signed my name to this specification in the presence of two subscribing witnesses.

FRANZ WINKLER.

Witnesses:
   JEAN GRUND,
   CARL GRUND.